March 27, 1951 M. P. WINTHER 2,546,378
TRANSMISSION
Filed April 21, 1949 3 Sheets-Sheet 1

Martin P. Winther,
Inventor.
Haynes and Koenig,
Attorneys.

March 27, 1951 — M. P. WINTHER — 2,546,378
TRANSMISSION
Filed April 21, 1949 — 3 Sheets-Sheet 3
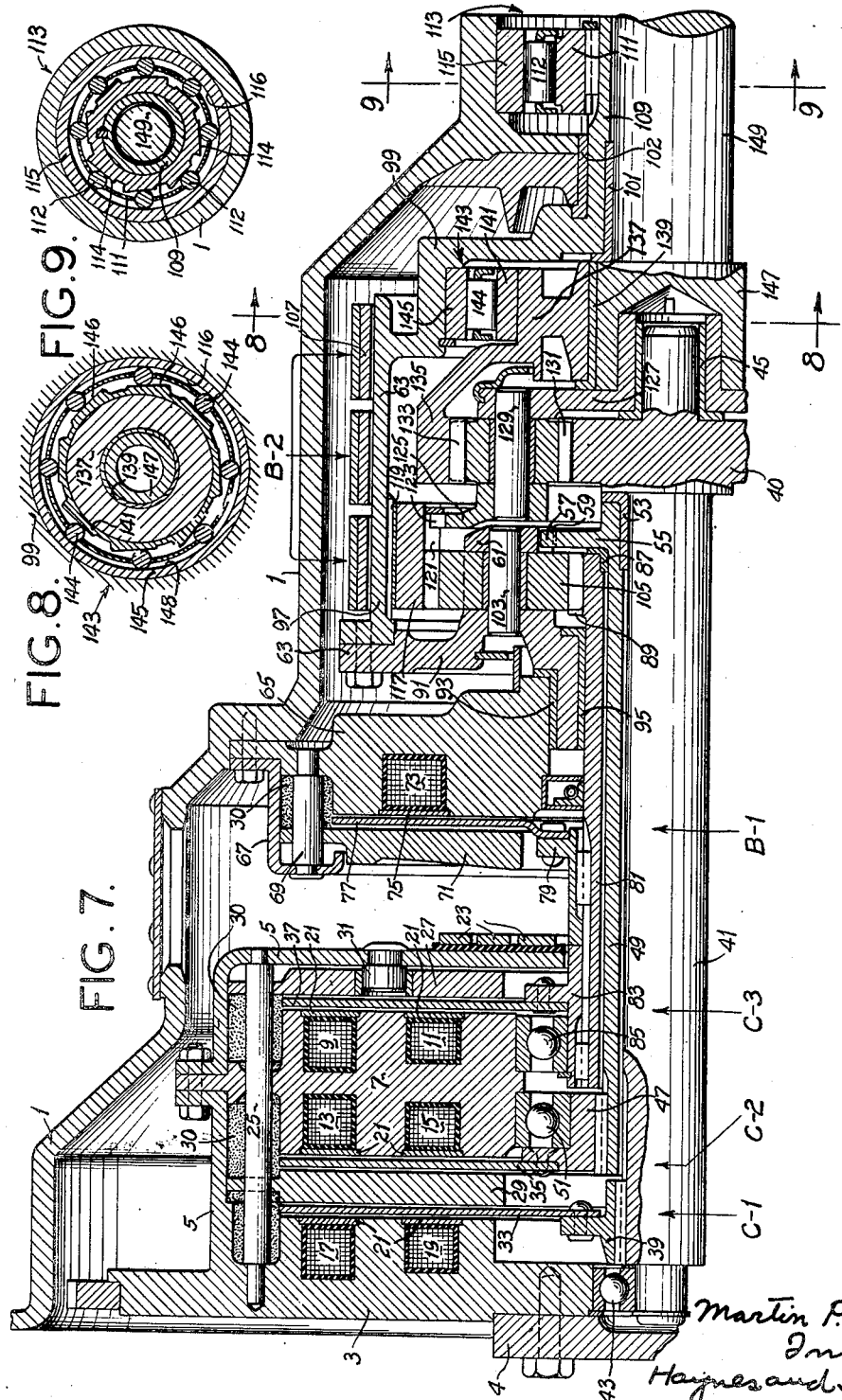

Patented Mar. 27, 1951

2,546,378

UNITED STATES PATENT OFFICE 2,546,378

TRANSMISSION

Martin P. Winther, Gates Mills, Ohio, assignor to Martin P. Winther, as trustee

Application April 21, 1949, Serial No. 88,880

12 Claims. (Cl. 74—759)

This invention relates to transmissions, and with regard to certain more specific features, to improvements upon the transmission shown in the United States patent application of myself and Anthony Winther, Serial No. 593,236, filed May 11, 1945, for Transmission, issued as Patent No. 2,540,639, dated February 6, 1951.

The invention has for its object the provision of an extra speed for the transmission of said application without the need for the addition of any gears. This is accomplished by providing an additional drive for the planetary carrier of an already existent planetary gear train in said transmission. The drive for the purpose requires only an extra clutch and driving quill which not only is simpler to design than would be additional gear trains, but is more economical to produce and is trouble free.

The invention comprises, in addition, means for employing the added speed (which is fourth speed forward) as an overdrive without producing excessively high speeds of any existing gear. This latter feature is accomplished by coupling the annular gear of one of the planetary gear trains shown in said application with the carrier through an overrunning clutch. This provides for the added speed without interfering with the former operation of the transmission at other speeds. Other features will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of various possible embodiments of the invention is illustrated, Figs. 1-5 are schematic diagrams only of pertinent torque-carrying parts involved in the power flow through the transmission for first, second, third, fourth and reverse speeds, respectively;

Fig. 7 is a longitudinal half section of a practical embodiment of the invention;

Figure 6:
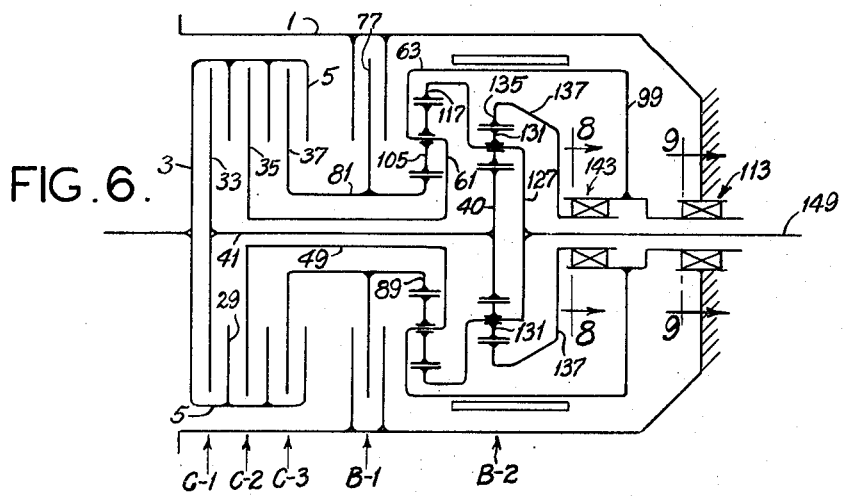
Fig. 6 is a complete schematic diagram of the parts fragmentarily shown in Figs. 1-5.
Figure 1:
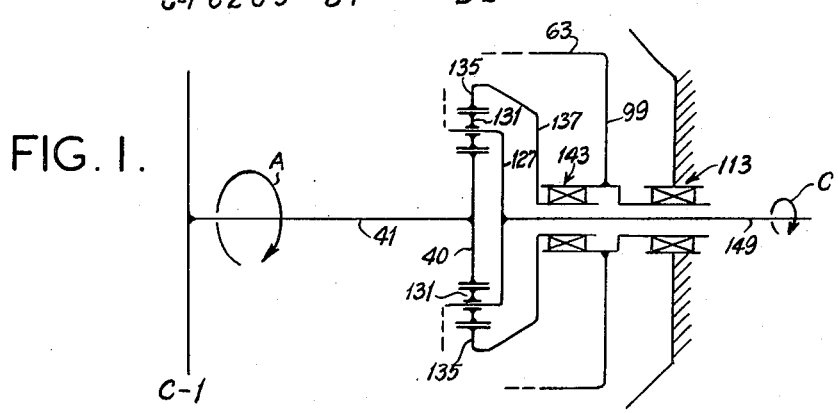
Figure 2:
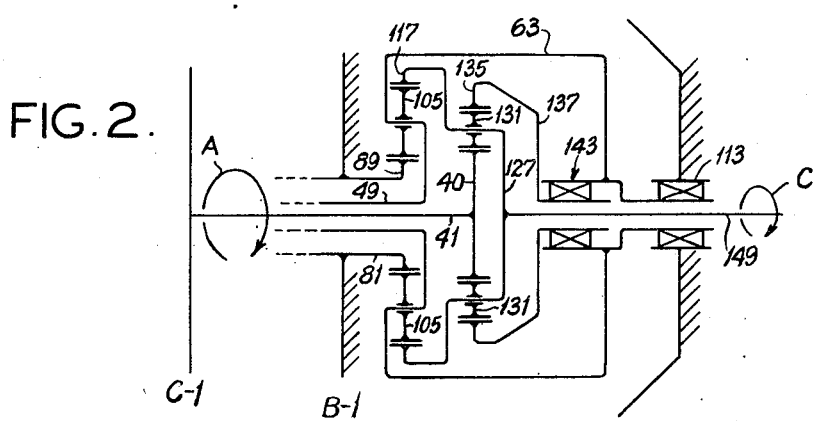
Figure 3:
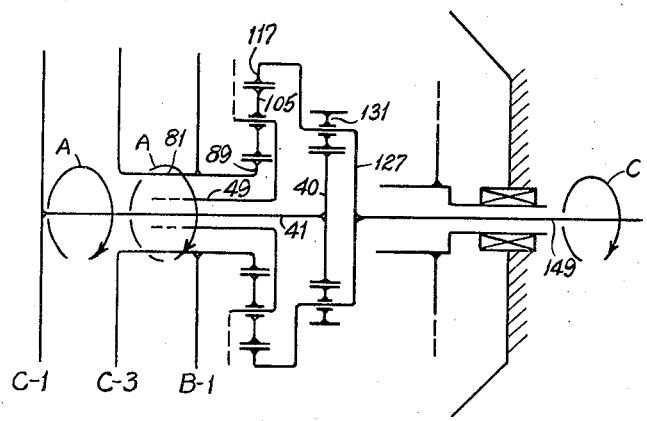
Figure 4:
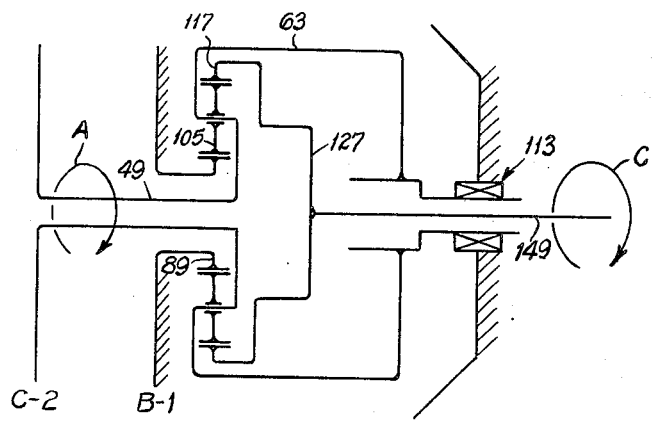
Figure 5:
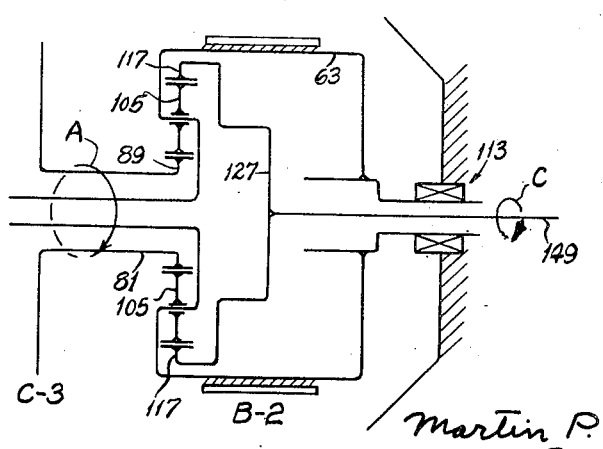

Fig. 8 is an enlarged typical section taken on line 8—8 of Figs. 6 and 7, illustrating the operative direction of a roller clutch or reverse-locking brake; and, Fig. 9 is an enlarged typical section taken on line 9—9 of Figs. 6 and 7, illustrating the operative direction of another roller clutch or reverse-locking brake.

Similar reference characters indicate corresponding parts throughout the several views of the drawings.

Diagrammatic Figs. 1-5 have been placed first in order of the drawings so that their identifying numbers conveniently correspond to the first to fifth speeds, respectively, to which these figures relate. Diagrammatic Fig. 6 integrates the showings of Figs. 1-5. Description however will be started with the practical embodiment of the invention represented by Fig. 7. Since the invention relates to internal structural improvements, the external controls are not described. These form no part of the present invention per se.

Referring now more particularly to Fig. 7 (in connection with which Fig. 6 may also be followed), numeral 1 indicates the transmission case or frame, which is stationary and carries a rotary fly wheel 3 driven from the usual flange 4 of an engine (not shown). The flywheel 3 carries a housing 5 which rotates with it. Within the housing 5 is a magnetic driving ring 7 which carries two pairs of annular electrical excitation coils 9, 11 and 13, 15. In the flywheel 3 (which is also magnetic) is carried a pair of annular excitation coils 17, 19. The stated coils are carried in grooves, being held in place by nonmagnetic rings 21. Each pair of coils (1, 11), (13, 15) and (17, 19) is independently excited, but both coils of each pair are excited simultaneously so as to be operative together. Details of the excitation circuits will not be necessary, since it is well known how to serve current to rotary coils in electrical machinery. It suffices to say that each pair of coils is supplied with current over one of the collector rings 23 shown on the housing 5, suitable brushes feeding the collector rings and the coils being grounded to complete the respective circuits.

The housing 5 also carries guide pins peripherally spaced and one of which is shown at 25. These guide pins slidably support driving magnetic clutch plates 27 and 29, the plates being driven in a rotary manner by the pins and being axially slidable thereon. Additional guide pins 31 are also employed for the plate 27. The peripheries of the plates slidably fit the interior of the housing 5.

Between the left-hand side of plate 29 and the right-hand side of the flywheel is interposed a driven clutch plate 33 of what will hereinafter be called a first power clutch C—1. Between the right-hand side of the driving plate 29 and the left-hand side of the driving ring 7 is interposed a driven clutch plate 35 of what will hereinafter be called a second power clutch C—2.

Between the right-hand side of the driving ring 7 and the left-hand side of the drying plate 27 is interposed a driven clutch plate 37 of what will hereinafter be referred to as a third power clutch C—3.

When the pair of clutch coils 17, 19 is excited, their resulting toroidal flux fields (which magnetically link members 3, 33 and 29) will draw the plate 29 to the left, thus closing clutch C—1. When the pair of coils 13, 15 is excited, their resulting toroidal flux fields (which magnetically link the members 7, 35 and 29) will draw the plate 29 to the right, thus closing the clutch C—2. When the pair of coils 9, 11 is excited, their toroidal flux fields (which magnetically link the members 7, 37 and 27) will draw the plate 27 to the left, thus closing the clutch C—3. In the absence of excitation of the coils mentioned plates 27 and 29 are released and the respective clutches are open.

The driven plate 33 of clutch C—1 is fastened to a hub 39 which is keyed to a central shaft 41, supported at the left in a bearing 43 and at the right in a pilot bearing 45. At its right-hand end the shaft 41 carries a primary pinion or sun gear 40. The driven plate 35 of clutch C—2 is fastened to a hub 47 which is keyed to a quill 49. The hub 47, being supported in a bearing 51 within the ring 7, in effect makes the quill 49 supported on that bearing. At its right-hand end the quill 49 is carried upon a sleeve bearing 53 around the central shaft 41. At this end, the quill carries a flange 55 which is peripherally toothed as shown at 57 for an interlocking engagement or crown coupling engagement with inwardly directed peripheral teeth 59 of a ring 61. The ring 61 is concentric with the flange 55 and the teeth 57 and 59 therefore form a direct interlock between the quill 49 and the ring to produce a permanent (1):(1) rotary relationship. As will be shown below, the ring 61 is integrally rotary with a carrier 63 of a secondary planetary gear train. The clutch C—2 and quill 49 interlock with this carrier 63 and constitute one of the novel features of the present invention.

At B—1 is shown an electric brake constituted by a magnetic ring 65 bolted with a housing 67 to the case 1. Studs 69 are carried between the housing 67 and ring 65, a suitable number of these being spaced peripherally. Sliding axially on the studs is a magnetic brake ring 71 the periphery of which slides in housing 67. While this brake ring is axially movable, it, like the brake ring 65, is not rotary. Carried in the brake ring 65 is an annular field coil 73, lying in a suitable groove and held in place by a nonmagnetic ring 75. Carried between the brake rings 65 and 71 is a magnetic brake disc 77. When the coil 73 is energized, the resulting toroidal magnetic field interlinks the members 65, 77 and 71, thereby drawing the ring 71 toward the ring 65 and closing brake B—1. When the coil 73 is deenergized, brake B—1 opens.

It may be mentioned at this point that any of the usual forms of electromagnetic clutches are satisfactory for C—1, C—2 and C—3, or an electromagnetic brake for B—1. A particularly satisfactory form of each is one in which a flexible magnetic mixture is used such as shown at numeral 30. This mixture may be of powdered iron with oil or grease, the operation of which is disclosed in the United States patent application of myself and Anthony Winther, Serial No. 83,980, filed March 28, 1949, for Electromagnetic Clutch. Further description herein will not be necessary since more conventional clutches or brakes are satisfactory; except to state that when either of the members 27, 29 or 71 is attracted by a flux field, its piston effect in the casing 5 or 67 tends to squeeze some of the flowable magnetic material around the respectively operative clutch plate 33, 35 or 37, while at the same time the apparent viscosity of the material 30 is increased magnetically. Thus the frictional driving or braking effect occurs in part through shearing of the magnetic fluid interposed between the friction surfaces. However, as stated, this type of clutch or brake is simply a refinement over other more conventional clutches or brakes that may be used.

Centrally, the brake disc 77 is attached to a hub 79 which is keyed to a second quill 81 surrounding the first quill 49. This second quill 81 also carries a second hub 83, which in turn carries the driven disc 37 of the clutch C—3. The hub 83, and thus also the quill 81, are borne upon a bearing 85 within the ring 7. At its other end, the quill 81 is supported upon a bearing 87 surrounding the quill 49. At this end, the quill 81 is also provided with a secondary sun gear or pinion 89. Thus it will be clear that the quill 81, gear 89, brake disc 77 and clutch plate 37 form one integrally rotary unit; the clutch plate 35, quill 49, flange 55 and ring 61 form another integral rotary unit, attached to carrier 63; and clutch plate 33, central shaft 41 and primary sun gear 40 form another integral rotary unit (see Fig. 6).

The carrier 63 is an assembly composed of a supporting spider 91 rotary between bearings 93 and 95 within the ring 65 and around the quill 81, respectively; a cylindric brake drum 97; and a supporting spider 99 rotary between bearings 101 and 102. Operative on the brake drum 97 is a releasable brake band system 107 which, with the drum 97, forms a second and releasable brake B—2. This may be any suitable band brake.

Keyed to an extension quill 109 of the spider 99 is the inner race 111 of a reverse-locking brake 113 (Fig. 9). The outer race 115 of this brake is fixed in the case 1 and the arrangement is such that the inner race 111 may rotate clockwise (viewed from the left end of the machine in Fig. 7) but may not rotate anticlockwise, being then anchored with respect to the case 1. In other words, the carrier 63 can rotate clockwise only, and if an attempt is made to rotate it anticlockwise, it will lock with respect to the case 1. The essentials of such a roller brake are shown in Fig. 9, wherein numerals 112 indicate the braking members and numerals 114 and 116 represent the one-way braking surfaces. Other equivalent reverse-locking brakes may be used. They are sometimes referred to in the literature as one-way, overrunning or freewheeling clutches.

The ring 61 and spider 91 are connected by studs 103 at spaced peripheral intervals. Each stud 103 carries a secondary planetary gear 105 which centrally meshes with the secondary sun gear 89. Each planetary gear 105 meshes outwardly with the interior teeth 121 of an annular or secondary ring gear 117. Gear 117 is carried by the primary carrier 127. This ring gear 117 is rotary in the carrier 63, being supported in a bearing 119 on the inside of the carrier. The internal teeth 121 mesh with outwardly extending teeth 123 of a ring 125. The ring 125 and annular gear 117 being concentric, this means that they are locked for (1):(1) rotation. The ring 125 and a primary carrier 127 carry studs 129 upon which are primary planetary gears 131 meshing centrally with the primary sun gear 40. These gears 131 mesh outwardly with internal teeth 133 of a primary internal ring gear 135 forming part of a reverse-locking reactor ring 137. Ring 137 is carried upon a bearing 139 and carries the internal race 141 of a second one-way overrunning or freewheeling clutch 143 illustrated also in Fig. 8. The outer race 145 of the overrunning clutch 143 is fixed in the secondary carrier 63. The clutch 143 is such that, relative to the carrier 63, the reactor ring 137 may move only clockwise (Fig. 8). Any attempt to turn the reactor ring 137 anticlockwise relative to the secondary carrier 63 results in the two members 137 and 63 being locked together. These points are illustrated in Fig. 8, wherein numerals 144 represent the locking rollers and numerals 146 and 148 the locking surfaces. Other equivalent reverse-locking brakes overrunning or one-way clutches may be used. The primary carrier 127 is attached within the enlarged end 147 of the driven shaft 149 of the transmission, the latter being coupled to the load to be driven.

It will be understood in respect to the gears 105 and 131, that only one each is shown in the half section of Fig. 7, but that a plurality of each of these is arranged at spaced intervals around the transmission as is usual for balance in the case of planetary gear trains. For example, two or three, or more, each may be used at 180°, 120° et cetera.

Operation can be traced from the power flow diagrams (Figs. 1-5) and the following power flow chart, in which letter O indicates an open or released condition, the letter C a closed condition, and a dash (—) represents either an open, a closed or an indifferent condition. The last line specifies the typical speed ratios for the various speeds listed.

*Power flow chart*

| Item | Speed | | | | |
|---|---|---|---|---|---|
| | First or Low | Second | Third or Direct | Fourth or Overdrive | Reverse |
| Clutch C-1 | C | C | C | O | O |
| Clutch C-2 | O | O | O | C | O |
| Clutch C-3 | O | O | C | O | C |
| Reverse-acting brake or Clutch 143 | C | C | — | O | C |
| Brake B-1 | O | C | O | C | O |
| Brake B-2 | O | O | O | O | C |
| Reverse-acting brake or Clutch 113 | C | O | O | O | — |
| Typical Speed Ratio | 3 to 1 | 1.5 to 1 | 1 to 1 | .72 to 1 | 3 to 1 |

In all the Figs. 1-5, the curled arrows A represent engine speed and the curled arrows C driven speed. All of the curled arrows A are of the same size and the relative sizes shown for C in the respective figures qualitatively indicate the velocity of the driven shaft 149.

In Figs. 1-5, cross hatching indicates that under the conditions indicated, the parts hatched are fixed at the moment, relative to the case, which latter is a frame of reference and hatched in all of Figs. 1-6.

*First or low speed (Figs. 1 and 7)*

Coils 17 and 19 are excited, thus drawing over the clutch plate 29 and closing power clutch C-1, which places in rotation the central shaft 41 and primary sun gear 40. Assume the rotation to be clockwise, viewed from the left, as shown by the arrow A. This will tend to turn the planetary gears 131 anticlockwise. These then tend to turn the internal gear 135 anticlockwise, along with the reactor ring 137. This anticlockwise rotation locks the freewheeling clutch 143, which tends to turn the primary carrier 63 anticlockwise which in turn locks the reverse-locking brake 113 which becomes the fixed fulcrum of the system. The result is that the internal gear 135 cannot move anticlockwise and the pinions 131 must roll around the internal gear 135, thus forcing the primary carrier 127 clockwise at reduced speed. Since the primary carrier 127 drives the shaft 149, the latter is driven at reduced speed in the ratio of (3):(1) relative to the flywheel 3. As the chart shows, the clutches C-2, C-3 and brakes B-1 and B-2 are at this time released, so that there are no inconsistent movements required of the parts shown in Fig. 1 by the parts that are not shown.

*Second speed (Fig 2)*

Clutch C-1 remains closed and brake B-1 is set or locked. Again shaft 41 and primary sun gear 40 rotate clockwise as for first speed, but the fulcrum of the system transfers from the clutch 113 to the now fixed gear 89. The resulting operation includes movement of the secondary carrier 63 clockwise which opens brake 113, the clutch 143 remaining closed. Thus the action is like that in low gear (Fig. 1) except that there is added the motion induced by carrier 63 in rolling gears 105 on the stationary sun gear 89. These, through gear 117, advance the motion of carrier 127 and shaft 149 over what it is under first speed conditions. The resulting speed ratio of 41 to 149 is (1.5):(1).

*Third speed (Fig. 3)*

In this case, clutches C-1 and C-3 are closed. The brake B-1 is released. Therefore, the quill 81 and shaft 41 move at the same angular velocity (see arrows A). This causes gears 40 and 89 to move at the same angular velocity. Then the entire system 41, 40, 131, 105, 127 rotates as a unit, driving the shaft 149 at a (1):(1) speed ratio with respect to the shaft 41. There is no planetary action in this speed.

*Fourth speed or overdrive (Fig. 4)*

In this case, clutch C-2 is closed, causing rotation of the quill 49. Brake B-1 is again locked, which locks gear 89. Quill 49 rotates the secondary carrier 63. Thus the secondary planetary gears 105 roll on the stationary sun gear 89, driving ahead the secondary annular gear 117. This drives ahead the primary carrier 127, which drives the shaft 149 at a ratio of approximately (.72):(1). In other words, the shaft 149 rotates faster than the clutch C-2 which constitutes overdrive. Under these operating conditions, the forwardly rotating secondary carrier 63 opens brake 113.

*Reverse speed (Fig. 5)*

Clutch C-3 is closed and brake B-2 is locked. Thus C-3 drives the quill 81. The secondary carrier 63 being fixed in position by the brake B-2, fixes the axes of the gears 105. Thus clockwise rotation of the quill 81 drives gear 89 clockwise, driving gears 105 anticlockwise, which in turn drive the gear 117 anticlockwise. The result is that the primary carrier 127 drives the shaft 149 anticlockwise, as shown, at a speed ratio of approximately (3):(1). Under these conditions there is no planetary action.

It will be understood in the above that Figs. 1-6, being diagrammatic, do not portray actual gear diameters. Fig. 7 illustrates a practical set of relationships between gear diameters. It will also be understood in connection with Figs. 1-5 that the missing parts are not necessary to the operations connected with the speeds discussed.

From the above, the advantages of the invention will be clear. Simply by providing the additional clutch C—2 with a direct connection to the secondary carrier 63, the additional fourth speed or overdrive is obtained without the addition of any gears to the construction shown in said Patent No. 2,540,639. Moreover, instead of connecting gear 135 directly to the secondary carrier 63 (as in said Patent No. 2,540,639) and by connecting it thereto through the overrunning clutch 143 (as herein), the overdrive of Fig. 4 herein may be obtained without excessively high speed forward of the shaft 41, which is then out of action. Thus excessive idling speeds of non-connected gears are avoided under overdrive conditions. Of course this problem did not present itself in said Patent No. 2,540,639 because there is no overdrive therein. This last-mentioned feature of the invention may be summed up in the statement that provision has been made to let the primary ring gear 135 float, except when it is required for driving.

Although the member 143 has above been referred to as an overrunning clutch and freewheeling clutch, it will be understood that it may also be considered to be a reverse-locking brake in the sense that it permits forward motion of one member relative to another but locks the one member against reverse movement with respect to the other.

Note is to be taken of the fact that in the appended claims clutch C—1 is referred to as a first clutch; C—3 as a second clutch; and clutch C—2 as a third clutch.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A transmission comprising a frame, a driving member, a driven member, a first clutch driven by the driving member, a primary planetary gear train connecting the clutch and the driven member; said train including a primary planetary gear, a carrier therefor, a primary sun gear driven by said first clutch and meshing with the primary planetary gear, and a primary ring gear also meshing with said primary planetary gear; a second clutch adapted to be driven by the driving member, a secondary gear train including a secondary carrier supporting a secondary planetary gear, a secondary sun gear adapted to be driven by said second clutch and meshing with the secondary planetary gear, and a secondary ring gear also meshing with said secondary planetary gear and carried by the primary carrier; and a third clutch directly connecting said driving member with said secondary carrier, said primary carrier and secondary ring gear being connected to said driven member.

2. A transmission comprising a frame, a driving member, a driven member, a first clutch driven by the driving member, a primary planetary gear train connecting the driving and driven members including a primary carrier attached to the driven member and supporting a primary planetary gear of said planetary train, a primary sun gear driven by said first clutch and meshing with the primary planetary gear, and a primary ring gear also meshing with said primary planetary gear; a brake; a second clutch adapted to be driven by the driving member, a secondary planetary gear train including a secondary carrier supporting a secondary planetary gear, a secondary sun gear adapted to be driven by said second clutch or be locked against rotation by said brake and meshing with the secondary planetary gear, a secondary ring gear also meshing with said secondary planetary gear and carried by the primary carrier, a second brake for progressively locking said secondary sun gear against rotation; a third clutch adapted directly to connect said driving member with said secondary carrier; and a reverse-locking brake connecting the secondary carrier with the frame to prevent relative movement thereof, said primary carrier and said secondary ring gear being interconnected.

3. A transmission comprising a frame, a driving member, a driven member, a first clutch driven by the driving member, a primary planetary gear train connecting the driving and driven members including a primary carrier attached to the driven member and supporting a primary planetary gear, a primary sun gear driven by said first clutch and meshing with the primary planetary gear, and a primary ring gear also meshing with said primary planetary gear; a second clutch adapted to be driven by the driving member, a secondary planetary gear train including a secondary carrier supporting a secondary planetary gear, a secondary sun gear adapted to be driven by said second clutch and meshing with the secondary planetary gear, and a secondary ring gear also meshing with said secondary planetary gear and carried by the primary carrier; a brake for locking said secondary sun gear against rotation, a third clutch directly connecting said driving member with said secondary carrier; a reverse-locking brake connecting the secondary carrier with the frame to limit rotation of said secondary carrier to a direction with that of said driving member; and an overrunning clutch connecting said primary ring gear with the secondary carrier for unitary rotation, said primary carrier and said secondary ring gear being interconnected.

4. A transmission comprising a frame, a driving member, a driven member, a first clutch driven by the driving member, a primary planetary gear train connecting the clutch and the driven member; said train including a primary carrier attached to the driven member and supporting a primary planetary gear, a primary sun gear driven by said first clutch and meshing with the primary planetary gear, and a primary ring gear also meshing with said primary planetary gear; a second clutch adapted to be driven by the driving member, a secondary planetary gear train including a secondary carrier supporting a secondary planetary gear, a secondary sun gear adapted to be driven by said second clutch and meshing with the secondary planetary gear, and a secondary ring gear also meshing with said secondary planetary gear and carried by the primary carrier; a brake for restraining said secondary sun gear from rotation, and a third clutch directly connecting said driving member with said secondary carrier, said primary carrier and said secondary ring gear being interconnected.

5. A transmission comprising a frame, a driving member, a driven member, a first clutch driven by the driving member, a primary planetary gear train connecting the clutch and the driven member; said train including a primary carrier attached to the driven member and supporting a primary planetary gear, a primary sun gear driven by said first clutch and meshing with the primary planetary gear, and a primary ring gear also meshing with said primary planetary gear; a second clutch adapted to be driven by the driving member, a secondary planetary gear train including a secondary carrier supporting a secondary planetary gear, a secondary sun gear adapted to be driven by said second clutch and meshing with the secondary planetary gear, and a secondary ring gear also meshing with said secondary planetary gear and carried by the primary carrier; a brake adapted to restrain said secondary sun gear against rotation, a third clutch directly connecting said driving member with said secondary carrier, and a second brake for connecting the secondary carrier with the frame to prevent relative movement thereof, said primary carrier and said secondary ring gear being interconnected.

6. A transmission comprising a frame, a driving member, a driven member, a first clutch driven by the driving member, a primary planetary gear train connecting the clutch and driven member; said train including a primary carrier attached to the driven member and supporting a primary planetary gear, a primary sun gear driven by said first clutch and meshing with the primary planetary gear, and a primary ring gear also meshing with said primary planetary gear; a second clutch adapted to be driven by the driving member, a secondary planetary gear train including a secondary carrier supporting a secondary planetary gear, a secondary sun gear adapted to be driven by said second clutch and meshing with the secondary planetary gear, and a secondary ring gear also meshing with said secondary planetary gear and carried by the primary carrier; a brake for selectively locking said secondary sun gear against rotation, a third clutch directly connecting said driving member with said secondary carrier, a reverse-locking brake connecting the secondary carrier with the frame to limit rotation of said secondary carrier to a direction with that of said driving member, a brake for locking said secondary carrier independently of said reverse-locking brake, and an overrunning clutch connecting said primary ring gear with the secondary carrier for unitary rotation, said primary carrier and said secondary ring gear being interconnected.

7. A transmission adapted to be driven by a prime mover comprising a frame, primary and secondary planetary gear trains; each train including a sun gear, a planetary gear, a carrier for its planetary gear, and a ring gear meshing with its planetary gear; a releasable driving clutch for each of said sun gears adapted to drive them independently or together from said prime mover, a third individually releasable clutch adapted to drive the carrier of said secondary train from said prime mover, a driven shaft connected to the primary carrier and the secondary ring gear, and a releasable brake for restraining rotation of said sun gear in the secondary planetary train.

8. A transmission adapted to be driven by a prime mover comprising a frame, primary and secondary planetary gear trains; each train including a sun gear, a planetary gear, a carrier for its planetary gear, and a ring gear meshing with its planetary gear; a releasable driving clutch for each of said sun gears adapted to drive them independently or together from said prime mover, a third individually releasable clutch adapted to drive the carrier of said secondary train from said prime mover, a driven shaft connected to the primary carrier and the secondary ring gear, a brake for restraining rotation of the sun gear in the secondary gear train, and a brake for selectively preventing rotation of the secondary planetary carrier.

9. A transmission for a prime mover comprising a frame, primary and secondary planetary gear trains; each train including a sun gear, a planetary gear, a carrier for the planetary gear, and a ring gear; a clutch for each of said sun gears adapted to drive them independently or together from said prime mover, a third individually operable clutch adapted to drive the carrier of said secondary train from said prime mover, a driven shaft connected to the primary carrier and the secondary ring gear, a brake for restraining rotation of said sun gear in the secondary gear train, a brake for selectively preventing rotation of the secondary planetary carrier, and an overrunning clutch between said secondary carrier and said ring gear in the primary gear train adapted to lock this carrier and ring gear for unitary movement.

10. A transmission for a prime mover comprising a frame, primary and secondary planetary gear trains; each train including a sun gear, a planetary gear, a carrier for the planetary gear, and a ring gear; a clutch for each of said sun gears adapted to drive them independently or together from said prime mover, a third individually operable clutch adapted to drive the carrier of said secondary train from said prime mover, a driven shaft connected to the primary carrier and the secondary ring gear, a brake for restraining rotation of said sun gear in the secondary planetary train, and a one-way reverse-locking brake adapted to limit rotation of said secondary carrier in a direction with that of said clutches.

11. A transmission for a prime mover comprising a frame, primary and secondary planetary gear trains; each train including a sun gear, a planetary gear, a carrier for the planetary gear, and a ring gear; a clutch for each of said sun gears adapted to drive them independently or together from said prime mover, a third individually operable clutch adapted to drive the carrier of said secondary train from said prime mover, a driven shaft connected to the primary carrier and to the secondary ring gear, a brake for restraining rotation of said sun gear in the secondary planetary train, a one-way reverse-locking brake for the secondary carrier adapted to limit rotation thereof in a direction with that of the clutches, and a second brake for preventing rotation of said secondary carrier.

12. A transmission for a prime mover comprising a frame, primary and secondary planetary gear trains; each train including a sun gear, a planetary gear, a carrier for the planetary gear, and a ring gear; a clutch for each of said sun gears adapted to drive them independently or together from said prime mover, a third individually operable clutch adapted to drive the carrier of said secondary train from said prime mover, a driven shaft connected to the primary carrier and the secondary ring gear, a brake for restraining rotation of said sun gear in the secondary planetary train, a one-way brake for the secondary carrier adapted to limit rotation thereof in a direction with that of the clutches, a second brake for preventing rotation of said secondary carrier, and an overrunning clutch between said secondary carrier and said primary ring gear adapted to lock this carrier and ring gear for unitary movement.

MARTIN P. WINTHER.

REFERENCES CITED

The following references are of record in the file of this patent:

UNITED STATES PATENTS

| Number | Name | Date |
|---|---|---|
| 2,197,536 | Burtnett | Apr. 16, 1940 |
| 2,259,729 | Burtnett | Oct. 21, 1941 |
| 2,259,730 | Burtnett | Oct. 21, 1941 |
| 2,259,731 | Burtnett | Oct. 21, 1941 |